(12) United States Patent
Du et al.

(10) Patent No.: US 12,058,312 B2
(45) Date of Patent: Aug. 6, 2024

(54) GENERATIVE ADVERSARIAL NETWORK FOR VIDEO COMPRESSION

(71) Applicants: KWAI INC., Palo Alto, CA (US); SANTA CLARA UNIVERSITY, Santa Clara, CA (US)

(72) Inventors: Pengli Du, San Jose, CA (US); Ying Liu, Santa Clara, CA (US); Nam Ling, San Jose, CA (US); Lingzhi Liu, San Jose, CA (US); Yongxiong Ren, San Jose, CA (US); Ming Kai Hsu, Fremont, CA (US)

(73) Assignees: KWAI INC., Palo Alto, CA (US); SANTA CLARA UNIVERSITY, Santa Clara, CA (US)

( * ) Notice: Subject to any disclaimer, the term of this patent is extended or adjusted under 35 U.S.C. 154(b) by 379 days.

(21) Appl. No.: 17/495,797

(22) Filed: Oct. 6, 2021

(65) Prior Publication Data

US 2023/0105436 A1    Apr. 6, 2023

(51) Int. Cl.
*H04N 19/105* (2014.01)
*G06N 3/045* (2023.01)
*G06N 3/08* (2023.01)
*H04N 19/172* (2014.01)
*H04N 19/513* (2014.01)
*H04N 19/91* (2014.01)

(52) U.S. Cl.
CPC ........... *H04N 19/105* (2014.11); *G06N 3/045* (2023.01); *G06N 3/08* (2013.01); *H04N 19/172* (2014.11); *H04N 19/513* (2014.11); *H04N 19/91* (2014.11)

(58) Field of Classification Search
CPC .. H04N 19/105; H04N 19/172; H04N 19/513; H04N 19/91; G06N 3/045; G06N 3/08
See application file for complete search history.

(56) References Cited

U.S. PATENT DOCUMENTS

| 2021/0125310 A1* | 4/2021 | Pu | G06T 5/20 |
| 2022/0101492 A1* | 3/2022 | Ding | H04N 19/117 |
| 2022/0167005 A1* | 5/2022 | Asif | H04N 19/54 |

OTHER PUBLICATIONS

B. Liu, Y. Chen, S. Liu and H.-S. Kim, "Deep Learning in Latent Space for Video Prediction and Compression," 2021 IEEE/CVF Conference on Computer Vision and Pattern Recognition (CVPR), Nashville, TN, USA, Jun. 25, 2021, pp. 701-710, doi: 10.1109/CVPR46437.2021.00076. (Year: 2021).*

(Continued)

*Primary Examiner* — Jeremiah C Hallenbeck-Huber
(74) *Attorney, Agent, or Firm* — Arch & Lake LLP (57) ABSTRACT

A method and an apparatus for video processing are provided. The method includes that a decoding terminal receives a plurality of coded video frames coded using one or more generative adversarial networks (GANs), receives network parameters related to the one or more GANs, and decodes the plurality of coded video frames using GANs based on the network parameters. Further, the one or more GANs respectively implement one or more video coding functions including reference-frame coding, motion-compensated frame prediction, and residue-frame coding.

18 Claims, 7 Drawing Sheets

(56) References Cited

OTHER PUBLICATIONS

Guo Lu, Wanli Ouyang, Dong Xu, Xiaoyun Zhang, Chunlei Cai, and Zhiyong Gao. Dvc: An end-to-end deep video compression framework. In The IEEE Conference on Computer Vision and Pattern Recognition (CVPR), Jun. 2019 (Year: 2019).*

S. Kim et al., "Adversarial Video Compression Guided by Soft Edge Detection," ICASSP 2020—2020 IEEE International Conference on Acoustics, Speech and Signal Processing (ICASSP), Barcelona, Spain, 2020, pp. 2193-2197, doi: 10.1109/ICASSP40776.2020. 9054165. (Year: 2020).*

D. Liu, Y. Li, J. Lin, H. Li, F. Wu, Deep learning-based video coding: A review and a case study, ACM Comput. Surv. 53 (1) (2020) 1-35. (Year: 2020).*

A. K. Sinha and D. Mishra, "Deep Video Compression using Compressed P-Frame Resampling," 2021 National Conference on Communications (NCC), Kanpur, India, 2021, pp. 1-6, doi: 10.1109/ NCC52529.2021.9530011. (Year: 2021).*

L. Zhao, S. Wang, S. Wang, Y. Ye, S. Ma and W. Gao, "Enhanced Surveillance Video Compression With Dual Reference Frames Generation," in IEEE Transactions on Circuits and Systems for Video Technology, vol. 32, No. 3, pp. 1592-1606, Mar. 2022, doi: 10.1109/TCSVT.2021.3073114. (Year: 2022).*

D. Ma, F. Zhang and D. R. Bull, "Gan-Based Effective Bit Depth Adaptation for Perceptual Video Compression," 2020 IEEE International Conference on Multimedia and Expo (ICME), London, UK, 2020, pp. 1-6, doi: 10.1109/ICME46284.2020.9102865. (Year: 2020).*

Y. Wu, T. He and Z. Chen, "Memorize, Then Recall: A Generative Framework for Low Bit-Rate Surveillance Video Compression," 2020 IEEE International Symposium on Circuits and Systems (ISCAS), Seville, Spain, 2020, pp. 1-5, doi: 10.1109/ISCAS45731. 2020.9180753. (Year: 2020).*

G. J. Sullivan, J.-R. Ohm, W.-J. Han, and T. Wiegand, "Overview of the high efficiency video coding (hevc) standard," IEEE Trans. Circuits Syst. Video Technol., vol. 22, No. 12, pp. 1649-1668, Dec. 2012, (20p).

A. Segall, V. Baroncini, J. Boyce, J. Chen, and T. Suzuki, "Joint call for proposals on video compression with capability beyond hevc," JVETH1002, Oct. 18-24, 2017, (27p).

B. Bross, K. Andersson, M. Blaser, V. Drugeon, S.-H. Kim, J. Lainema, J. Li, S. Liu, J.-R. Ohm, G. J. Sullivan, et al., "General video coding technology in responses to the joint call for proposals on video compression with capability beyond hevc," IEEE Trans. Circuits Syst. Video Technol., vol. 30, No. 5, pp. 1226-1240, Oct. 2019, (15p).

A. Krizhevsky, I. Sutskever, and G. E. Hinton, "Imagenet classification with deep convolutional neural networks," in Proc. Adv. Neural Inf. Process. Syst., Dec. 2012, (9p).

C. Szegedy, W. Liu, Y. Jia, P. Sermanet, S. Reed, D. Anguelov, D. Erhan, V. Vanhoucke, and A. Rabinovich, "Going deeper with convolutions," in Proc. IEEE Conf. Comput. Vision and Pattern Recognit., Jun. 2015, pp. 1-9.

K. He, X. Zhang, S. Ren, and J. Sun, "Deep residual learning for image recognition," in Proc. IEEE Conf. Comput. Vision and Pattern Recognit., Jun.-Jul. 2016, pp. 770-778, (9p).

S. Santurkar, D. Budden, and N. Shavit, "Generative compression," in Proc. IEEE Picture Coding Symp., Jun. 2018, pp. 258-262, (30p).

E. Agustsson, M. Tschannen, F. Mentzer, R. Timofte, and L. Van Gool, "Extreme learned image compression with gans," in Proc. IEEE/CVF Conf. Comput. Vision Pattern Recognit. Workshops, Jun. 2018, pp. 2587-2590, (4p).

I. Goodfellow, J. Pouget-Abadie, M. Mirza, B. Xu, D. Warde-Farley, S. Ozair, A. Courville, and Y. Bengio, "Generative adversarial nets," in Proc. Adv. Neural Inf. Process. Syst., Dec. 2014, pp. 2672-2680, (9p).

J. Ballé, V. Laparra, and E. P. Simoncelli, "End-to-end optimized image compression," in Proc. Int. Conf. on Learning Representations, Apr. 2017, pp. 1-27, (27p).

L. Theis, W. Shi, A. Cunningham, and F. Huszár, "Lossy image compression with compressive autoencoders," arXiv:1703.00395, 2017, (19p).

P. Isola, J.-Y. Zhu, T. Zhou, and A. A. Efros, "Image-to-image translation with conditional adversarial networks," in Proc. IEEE Conf. Comput. Vision and Pattern Recognit., Jul. 2017, pp. 1125-1134, (10p).

J.-Y. Zhu, T. Park, P. Isola, and A. A. Efros, "Unpaired image-to-image translation using cycle-consistent adversarial networks," in Proc. Int. Conf. Comput. Vision, Oct. 2017, pp. 2223-2232,(10p).

M. Mathieu, C. Couprie, and Y. LeCun, "Deep multi-scale video prediction beyond mean square error," in Proc. Int. Conf. on Learning Representations, May 2016, pp. 1-14,(14p).

C. Vondrick, H. Pirsiavash, and A. Torralba, "Generating videos with scene dynamics," in Proc. Adv. Neural Inf. Process. Syst., Dec. 2016, pp. 613-621,(9p).

Y. Zhou and T. L. Berg, "Learning temporal transformations from timelapse videos," in Proc. Eur. Conf. Comput. Vision, Oct. 2016, pp. 262-277, (16p).

M. Saito, E. Matsumoto, and S. Saito, "Temporal generative adversarial nets with singular value clipping," in Proc. IEEE Int. Conf. Comput. Vision, Oct. 2017, pp. 2830-2839,(10p).

X. Liang, L. Lee, W. Dai, and E. P. Xing, "Dual motion gan for futureflow embedded video prediction," in Proc. IEEE Int. Conf. Computer Vision, Oct. 2017, pp. 1744-1752, (9p).

S. Tulyakov, M.-Y. Liu, X. Yang, and J. Kautz, "Mocogan: Decomposing motion and content for video generation," in Proc. IEEE Conf. Comput. Vision and Pattern Recognit., Jun. 2018, pp. 1526-1535,(10p).

Tahmida Mahmud, Mohammad Billah, and Amit K Roy-Chowdhury, "Multi-view frame reconstruction with conditional gan," in 2018 IEEE Global Conference on Signal and Information Processing (GlobalSIP). IEEE, 2018, pp. 1164-1168.

C. Schuldt, I. Laptev, and B. Caputo, "Recognizing human actions: a local svm approach," in Proc. Int. Conf. Pattern Recognit., Aug. 2004, pp. 32-36, (5p).

T.-C. Wang, M.-Y. Liu, J.-Y. Zhu, A. Tao, J. Kautz, and B. Catanzaro, "High-resolution image synthesis and semantic manipulation with conditional gans," in Proc. IEEE Conf. Comput. Vision and Pattern Recognit., Jun. 2018, pp. 8798-8807, (10p).

Ren Yang, Fabian Mentzer, Luc Van Gool, and Radu Timofte, "Learning for video compression with hierarchical quality and recurrent enhancement," in Proceedings of the IEEE/CVF Conference on Computer Vision and Pattern Recognition (CVPR), 2020, (10p).

Tianfan Xue, Baian Chen, Jiajun Wu, Donglai Wei, and William T Freeman, "Video enhancement with task-oriented flow," International Journal of Computer Vision (IJCV), vol. 127, No. 8, pp. 1106-1125, 2019,(20p).

Zhou Wang, Eero P Simoncelli, and Alan C Bovik, "Multiscale structural similarity for image quality assessment," in The Thrity-Seventh Asilomar Conference on Signals, Systems & Computers, 2003. IEEE, 2003, vol. 2, pp. 1398-1402, (5p).

J. Lin, D. Liu, H. Li, and F. Wu, "Generative adversarial network-based frame extrapolation for video coding," in Proc. IEEE Vis. Commun. And Image Process., Dec. 2018, pp. 1-4, (4p).

Z. Jin, P. An, C. Yang, and L. Shen, "Quality enhancement for intra frame coding via cnns: An adversarial approach," in Proc. IEEE Int. Conf. Acoust. Speech Signal Process., Apr. 2018, pp. 1368-1372,(5p).

Z. Chen and T. He, "Learning based facial image compression with semantic fidelity metric," Neurocomputing, vol. 338, pp. 16-25, Apr. 2019, (14p).

S. Kim, J. S. Park, C. G. Bampis, J. Lee, M. K. Markey, A. G. Dimakis, and A. C. Bovik, "Adversarial video compression guided by soft edgedetection," in Proc. IEEE Int. Conf. Acoust. Speech Signal Process., May 2020, pp. 2193-2197, (5p).

Ruojing Wang, Zitang Sun, and Sei-ichiro Kamata, "Adaptive image compression using gan based semantic-perceptual residual compensation," in 2020 25th International Conference on Pattern Recognition (ICPR). IEEE, 2021, pp. 9030-9037, (8p).

* cited by examiner

GENERATIVE ADVERSARIAL NETWORK FOR VIDEO COMPRESSION

FIELD

The present application generally relates to video compression, and in particular but not limited to, video compression based on generative adversarial networks (GANs).

BACKGROUND

Video data has occupied people's daily professional and entertainment activities, such as video conferences, live commerce, online video games, live concerts and shows. When a popular live show has a high demand among audiences, it imposes a big pressure on the transmission bandwidth. Hence, it is desirable to develop effective video coding techniques to compress the video signal as much as possible and save the bandwidth, while still providing visually pleasing decoded videos to let the audiences enjoy the live show.

In the high efficiency video coding (HEVC) and the versatile video coding (VVC), signal processing and information theory based techniques are mainstream. In recent years, thanks to the advances in deep learning, a lot of deep learning-based video coding techniques have emerged. In particular, GAN-based image compression schemes have shown superior performance in offering high perceptual-quality decoded images. GAN was originally proposed to generate photo-realistic images from random noise, by training two competing networks: the generator and the discriminator. It has been showed that the decoded images of GAN-based compression systems are usually sharper and present more details than pure convolutional neural network (CNN)-based image compression that merely adopts mean-squared-error (MSE) loss to train the network.

Nevertheless, GANs have been only utilized for image compression, image style translation, artifact removal, or for video frame prediction and generation. Few research directly applied GAN to residue-frame coding.

SUMMARY

The present disclosure describes examples of techniques relating to video compression based on GANs.

According to a first aspect of the present disclosure, a method for video processing is provided. The method includes that a decoding terminal receives a plurality of coded video frames coded using one or more GANs, receives network parameters related to the one or more GANs, and decodes the plurality of coded video frames using GANs based on the network parameters.

According to a second aspect of the present disclosure, an apparatus for video processing is provided. The apparatus includes one or more processors and a memory configured to store instructions executable by the one or more processors.

Upon execution of the instructions, the one or more processors are configured to: receive a plurality of coded video frames coded using one or more GANs, receive network parameters related to the one or more GANs, and decode the plurality of coded video frames using GANs based on the network parameters.

According to a third aspect of the present disclosure, a non-transitory computer readable storage medium including instructions stored therein is provided. Upon execution of the instructions by one or more processors, the instructions cause the one or more processors to perform acts including: receiving a plurality of coded video frames coded using one or more GANs, receiving network parameters related to the one or more GANs, and decoding the plurality of coded video frames using GANs based on the network parameters.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g. devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure provides a video coding system in which both reference frames and target or residue frames are compressed by GAN. Since residue signals contain less energy, the video coding system provided effectively reduces the bit rates. Meanwhile, since the video coding system provided in the present disclosure adopts adversarial learning, the perceptual quality of decoded target frames is well-preserved.

GAN-based image compression trains a regular GAN network for image generation, and then uses the trained generator as the image decoder, followed by training an encoder to work with the previously learned decoder. In this way, the decompressed image is expected to look more like a natural image that has higher perceptual quality. A GAN may be used in a video compression system with frame interpolation in the latent space, i.e., encoded feature space.

A GAN may also be used to compress images and to synthesize unimportant regions in the decoded image from a semantic label map. A GAN-based face image compression scheme may consider the pixel-domain distortion loss and the adversarial loss, but also incorporate a semantic loss that preserves features for face recognition. Nevertheless, it is still desirable for GANs to consider videos, not limited to image compression.

A GAN-based video coding scheme may have a deterministic encoder that encodes the edges of the video frames with high compression rates, and the decoder is trained as a generator in a GAN setup. However, it is still desirable for GANs to explore motion and to perform residue coding.

In addition, a GAN may be used for artifact removal to enhance the quality of traditional intra-frame code. GAN may be used as a means for video prediction and generation, such as frame extrapolation, slow-motion and multi-view video generation. Nevertheless, it is desirable for GANs to participate in the actual compression module, instead of being utilized as a prediction tool.

The present disclosure provides a video coding architecture or system which starts with a reference-frame coding module, which encodes and decodes the reference frame $X_{t-1} \in \mathbb{R}^{H \times W \times 3}$ at time-slot t−1, using a GAN-based image compression scheme. The video coding system generates the decoded reference frame $\hat{X}_{t-1}$. Here H, W, and 3 represent the height, width, and channel of the frame.

Figure 1:
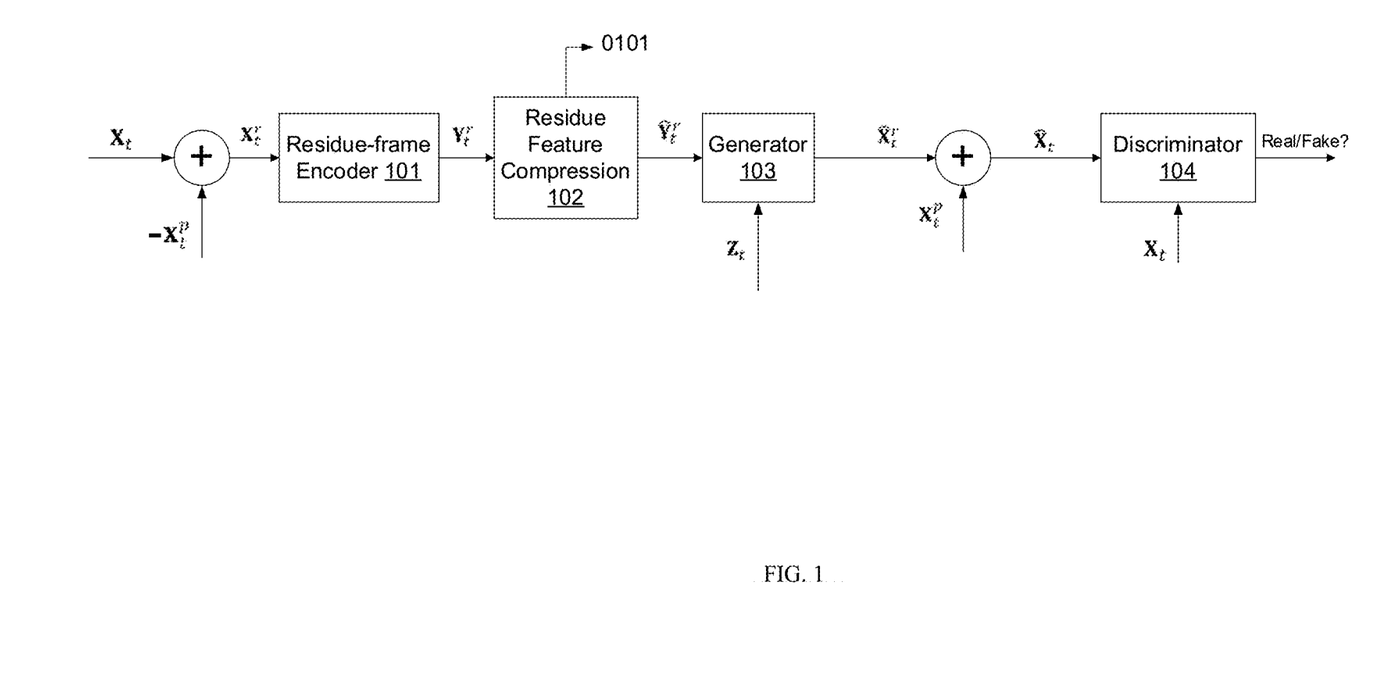
FIG. 1 is a block diagram illustrating a GAN-based residue-frame coding in accordance with an example of the present disclosure.
Figure 2:
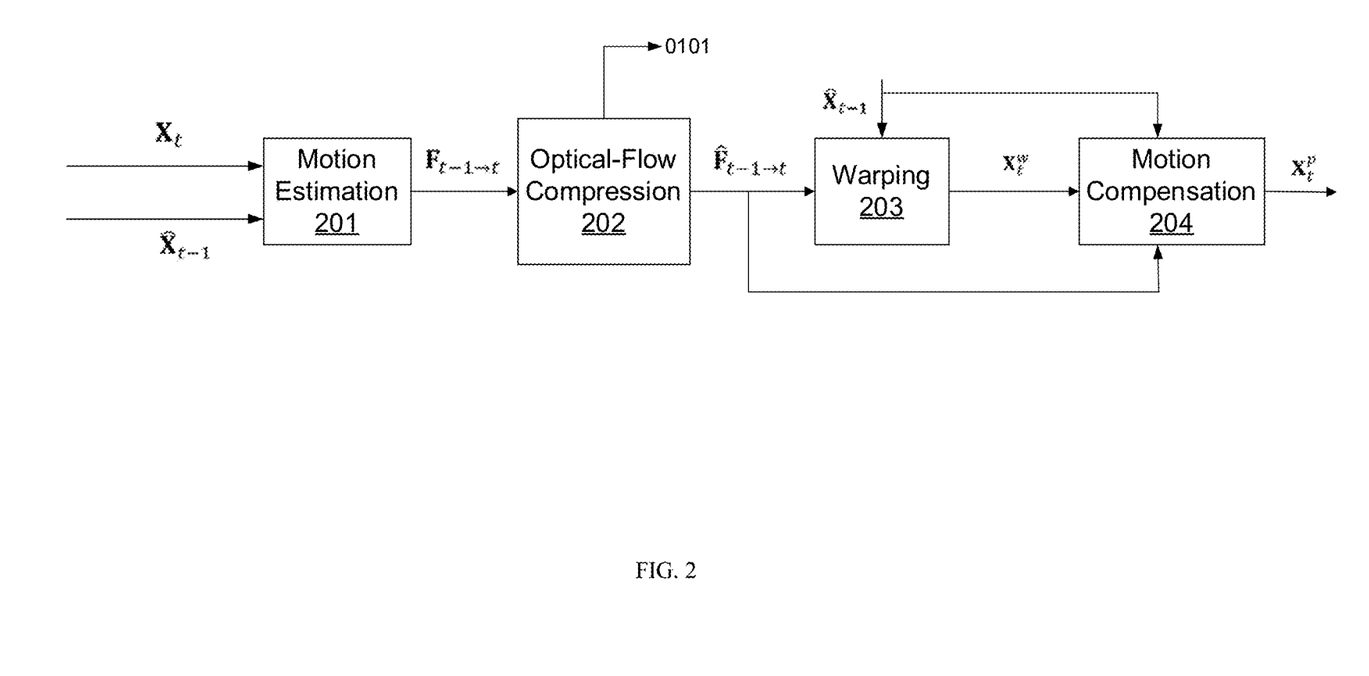
FIG. 2 is a block diagram illustrating a motion-compensated prediction in accordance with an example of the present disclosure.

FIGS. 1-2 illustrate a GAN-based inter-frame video coding system in accordance with an example of the present disclosure. FIG. 1 is a block diagram illustrating a GAN-based residue-frame coding in accordance with an example of the present disclosure. FIG. 2 is a block diagram illustrating a motion-compensated prediction in accordance with an example of the present disclosure.

As shown in FIGS. 1-2, the GAN-based inter-frame video coding system subsequently compresses the target frame $X_t$ with two modules including a motion-compensated target-frame prediction module and a GAN-based residue-frame coding module. As shown in FIG. 2, the decoded reference frame $\hat{X}_{t-1}$ and the ground-truth target frame $X_t$ are fed into a motion estimation and compensation module, to generate a motion compensated prediction $X_t^p$ of the target frame.

In some examples, a motion estimation 201 first estimates the optical flow $F_{t-1 \to t}$ between $\hat{X}_{t-1}$ and $X_t$, then an optical-flow compression 202 encodes $F_{t-1 \to t}$ into a bit stream. Then, warping 203 is performed on the decoded reference frame $\hat{X}_{t-1}$ and the decoded optical flow $\hat{F}_{t-1 \to t}$, to generate a warped target frame $X_t^w$. Finally, a motion compensation 204 processes $X_T^w$, $\hat{X}_{t-1}$, and $\hat{F}_{t-1 \to t}$ to generate the final prediction $X_t^p$ of the target frame.

As shown in FIG. 1, the motion-compensated prediction $X_t^p$ is subtracted from the target frame $X_t$ to obtain the residue frame $X_t^r$, which is the input of a residue-frame encoder 101. In some examples, the residue-frame encoder 101 is consisted of several convolutional layers and outputs the encoded residue feature $Y_t^r \in \mathbb{R}^{h \times w \times c}$, where h, w, and c represent the height, width, and channel of the feature maps. The output layer of the residue frame encoder 101 adopts the Rectified Linear Unit (ReLU) activation function. Then, a residue feature compression 102 performs quantization, arithmetic coding, and dequantization.

The input of the generator 103 is the channel concatenation of the de-quantized residue feature $\hat{Y}_t^r \in \mathbb{R}^{h \times w \times c}$, and a random noise $Z_t \in \mathbb{R}^{h \times w \times c}$. The generator 103 may also be called as decoder. The generator 103 is consisted of a convolutional layer with 960 feature maps, 9 residual blocks, each with 960 feature maps, several up-sampling layers that convert the height and width of the feature maps to the original frame size, followed by a convolutional layer that generates the decoded residue frame $\hat{X}_t^r \in \mathbb{R}^{H \times W \times 3}$. It is then added to the prediction $X_t^p$ to form the final output of the generator 103, that is, the decoded target frame $\hat{X}_t \in \mathbb{R}^{H \times W \times 3}$.

Multi-scale architecture may be used for the discriminator 104. The inputs of the discriminator 104 are $X_t^s$ and $\hat{X}_t^s$, representing the ground-truth and decoded t-th frame at scale s. Scale s=1 refers to the original resolution, scales $$s = \frac{1}{2} \text{ and } s = \frac{1}{4}$$

refer to the frame down-sampled by a factor of 2 and 4, respectively.

For each scale s, the discriminator processes the ground-truth $X_t^s$ to extract features $F_{t,l}^s$ of five convolutional layers l=1, 2, . . . , 5. The same operation is conducted on the decoded target frame $\hat{X}_t^s$ to extract features $\hat{F}_{t,l}^s$ of five layers l=1, 2, . . . , 5.

The loss function adopted to train the encoder and generator $L_{encoder-generator}(E, G)$ is consisted of three components, where E indicates the encoder, and G indicates the generator. The first component is the distortion loss defined as an MSE between the ground-truth target frame $X_t$ and the decoded target frame $\hat{X}_t$ $$L_{distortion}(E,G) = MSE(X_t, \hat{X}_t). \quad (1)$$

The second component is the generator loss defined as $$L_{generator}(E,G) = \|\hat{F}_{t,5}^1 - 1^1\|_F^2, \quad (2)$$

where $\hat{F}_{t,5}^1$ is the discriminator layer-5 feature extracted from the full-resolution decoded target frame $\hat{X}_t^1$, $1^1$ is an all-one tensor of the same size as $\hat{F}_{t,5}^1$, and $\|\bullet\|_F^2$ represents the squared Frobenius-norm. Minimizing such generator loss enforces each element in $\hat{F}_{t,5}^1$ to approach 1, which trains an encoder-generator pair that fools the discriminator. The third component is the feature matching loss defined as $$L_{feature}(E, G) = \sum_{s=1,\frac{1}{2},\frac{1}{4}} \sum_{l=1}^{4} MSE(F_{t,l}^s, \hat{F}_{t,l}^s). \quad (3)$$

Thus, the element-wise MSE between the discriminator features extracted from the ground-truth target frame and those extracted from the decoded target frame, summed over all scales and all intermediate discriminator layers l=1, 2, 3, 4.

Hence, the overall encoder-generator loss is defined as $$L_{encoder-generator}(E,G) = L_{generator}(E,G) + \lambda_x L_{distortion}(E,G) + \lambda_f L_{feature}(E,G), \quad (4)$$

where $\lambda_x$ and $\lambda_f$ are the weights that trade off the three components.

The loss function adopted to train the multi-scale discriminator is defined as $$L_{discriminator}(D) = \sum_{s=1,\frac{1}{2},\frac{1}{4}} \left( \|F_{t,5}^s - 1^s\|_F^2 + \|\hat{F}_{t,5}^s\|_F^2 \right), \quad (5)$$

where $1^s$ is an all-one tensor of the same size as $F_{t,5}^s$, $$s = 1, \frac{1}{2}, \frac{1}{4}.$$

Minimizing $L_{discriminator}(D)$ means that each element in $F_{t,5}^s$ should approach 1, and each element of $\hat{F}_{t,5}^s$ should approach 0, which can learn a discriminator that distinguishes the fake decoded target frames from the ground-truth target frames.

The present disclosure may be conducted on three HEVC test sequences, BlowingBubbles, BQSquare, and Johnny. The resolution of BlowingBubbles and BQSquare is 240×416. The original resolution of Johnny is 720×1280. To save the training time, Johnny is resized such that it has the same resolution 240×416 as the other two videos.

The frames in each video sequence are grouped as pairs of odd and even frames $(X_{t-1}, X_t)$, t=2, 4, 6, . . . , in which the odd frames are the reference frames, and the even frames are the target frames. The Johnny sequence has 600 frames in total, so there are 300 pairs of odd and even frames. These 300 pairs are randomized and split into 3 groups, each with 100 pairs. A GAN-based intra-frame compression network is first trained with the even frames in group 1. Afterwards, the trained intra-frame compression model is used to encode and decode the odd frames of group 2.

Additionally, the motion-compensated prediction model in FIG. 2 is applied to predict the ground-truth even frames of group 2 ($X_t$, t=2, 4, 6, . . . ) from the decoded odd frames of group 2 ($\hat{X}_{t-1}$, t=2, 4, 6, . . . ). The model was pre-trained by using the Vimeo-90K data set. The predicted frames are denoted as $X_t^p$, t=2, 4, 6, . . . . Then, the predicted and ground-truth even frames of group 2 are used to train the residue-frame compression network in FIG. 1. Furthermore, the 100 pairs in group 3 are used to test the trained GAN-based video coding model with three steps: reference-frame coding, motion-compensated frame prediction, and residue-frame coding. A similar approach is used for the training and testing of the other two video sequences.

Performance of the GAN-based inter-frame video coding system (GAN-Inter-MC) as shown in FIGS. 1-2 is subjectively evaluated by the visual quality of the decoded frames and quantitatively by the rate-distortion metrics. The distortion is measured by the PSNR and the MS-SSIM between the decoded and the ground-truth target frames, and the bit rates are measured by the average bits per pixel (bpp) of the encoded target frames.

Performance of the GAN-Inter-MC as shown in FIGS. 1-2 is compared to the GAN-Intra and another two state-of-the-art deep learning-based image compression schemes: the End-to-End and the CAE. These two models are CNN-based approaches with different network structures, but both of them adopt the MSE between the ground-truth frame and the decoded frame as the loss function.

Figure 3:
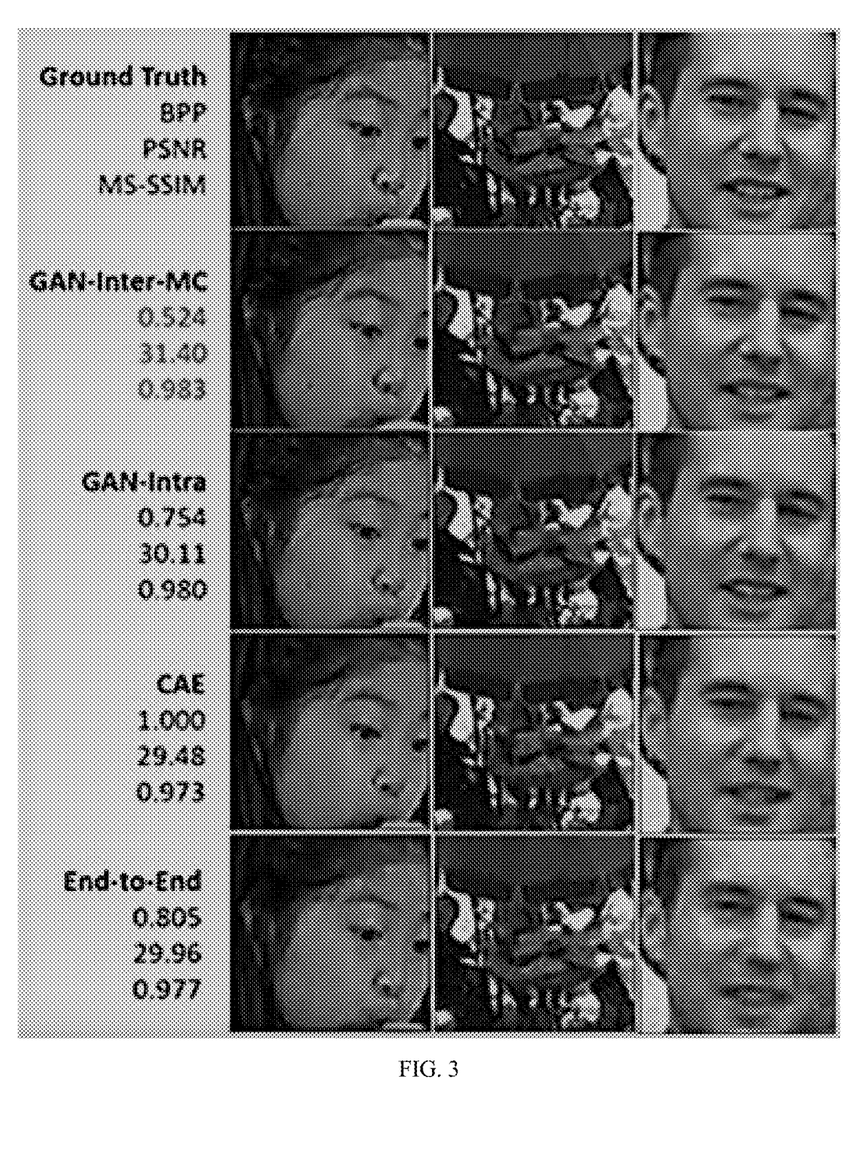
FIG. 3 is a block diagram illustrating an enlarged 70×70 region of a ground-truth target frame for each of three video sequences, and the corresponding decoding in accordance with an example of the present disclosure.

FIG. 3 shows an enlarged 70×70 region of a ground-truth target frame for each of the three video sequences, and the corresponding decoding by the GAN-Inter-MC, GAN-Intra, CAE and End-to-End. The average bit rates (bpp), PSNR (dB) and MS-SSIM values are labeled on the left side of the FIG. 3 and these values are calculated based on RGB color images. The GAN-Inter-MC scheme reduces the average bpp by 30.58%, 47.63%, and 34.98% while increasing the average PSNR by 1.29 dB, 1.92 dB, and 1.44 dB compared to GAN-Intra, CAE and End-to-End, respectively. The average MS-SSIM of GAN-Inter-MC is higher than that of the other three schemes. Besides, the perceptual qualities of the proposed GAN-Inter-MC and GAN-Intra are significantly better than those of CAE and End-to-End. They both recover texture details in the decoded frames, such as the girl's hair and ear areas for BlowingBubbles as shown in FIG. 3 left-column, the things on the table for BQSquares as shown in FIG. 3 middle-column, and the man's mouth for Johnny as shown in FIG. 3 right-column. In contrast, the decoded frames of CAE and End-to-End are much blurrier. The reason is CAE and End-to-End merely adopt MSE as their loss functions, and MSE only enforces consistency in pixel intensity values. Although the perceptual quality of the proposed GAN-Inter-MC is similar to that of GAN-Intra, it requires 30.58% less bit rates.

Figure 4:
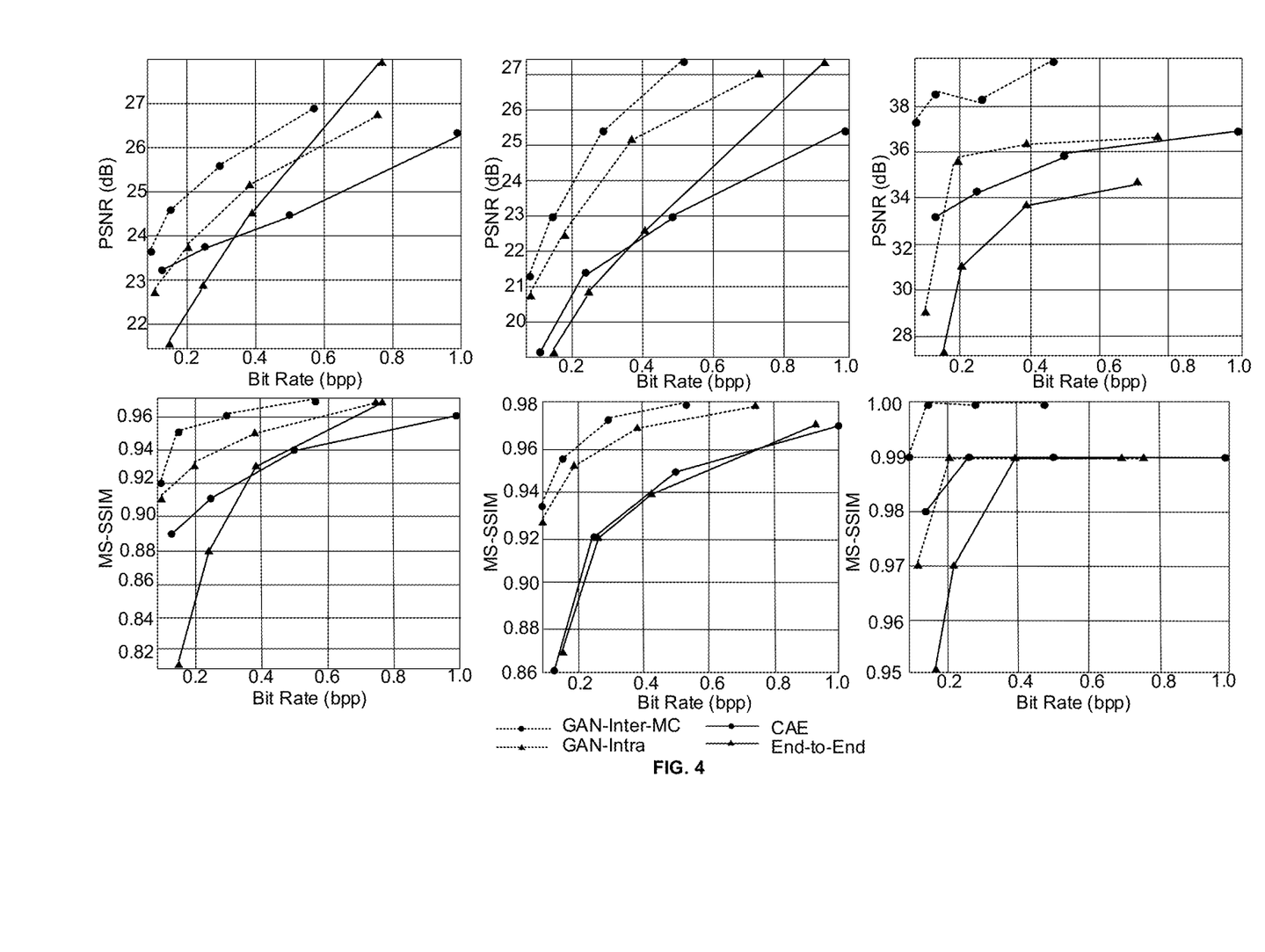
FIG. 4 illustrates peak signal-to-noise ratio (PSNR) and multi-scale structural similarity (MS-SSIM) versus bit rate curves by comparing a GAN-based inter-frame video coding system (GAN-Inter-MC) to other three methods including an original GAN-based image compression network (GAN-Intra), a compressive auto-encoder (CAE), and an end-to-end optimized image compression network (End-to-End) in accordance with an example of the present disclosure.

To provide quantitative performance evaluation in detail, the PSNR and MS-SSIM versus bit rate curves are illustrated in FIG. 4 by comparing the GAN-Inter-MC to the other three methods including GAN-Intra, CAE, and End-to-End. For all three videos, the GAN-Inter-MC is able to achieve the same or higher PSNR and MS-SSIM values at much lower bit rates, compared to all other schemes. Here, FIG. 4 illustrates the peak signal-to-noise ratio (PSNR) and the multi-scale structural similarity index (MS-SSIM) versus the bit rates (bpp) of BlowingBubbles (left-column), BQSquare (middle-column), and Johnny (right-column).

According to the present disclosure, the GAN-based inter-frame video coding system uses GAN to encode and decode both the reference frames and the residue between the target and predicted frames. The present disclosure effectively reduces the bit rates compared to GAN-based intra-frame compression. Compared to CNN-based image compression, the present disclosure has leveraged the adversarial learning of GAN to generate decoded frames that contain more texture details and are more consistent with HVS. Overall, the present disclosure simultaneously achieves high perceptual quality and reduces bit rates.

Figure 8:
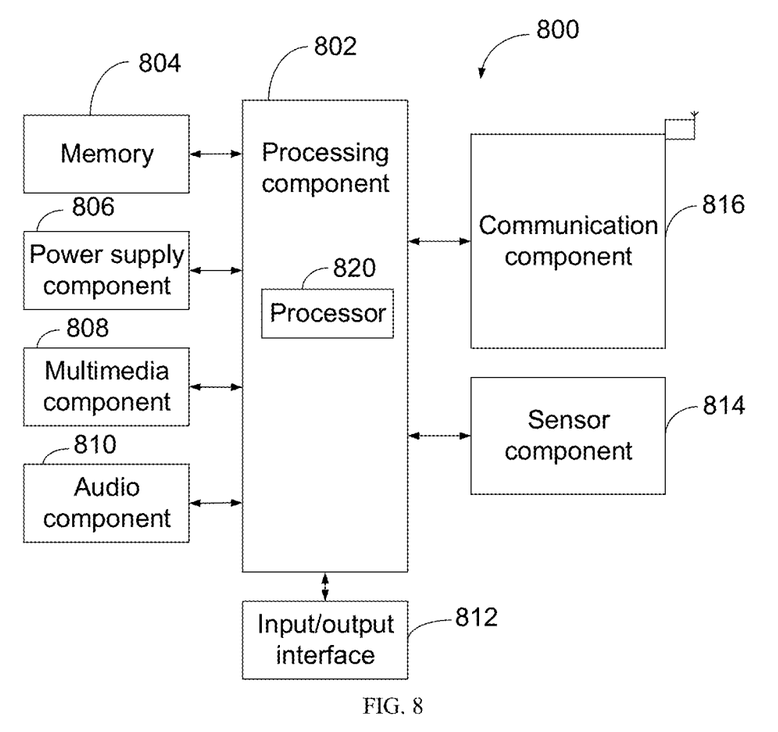
FIG. 8 is a block diagram illustrating an apparatus for video processing in accordance with an example of the present disclosure.

FIG. 8 is a block diagram illustrating an apparatus for video processing in accordance with an example of the present disclosure. The system 800 may be a terminal, such as a mobile phone, a tablet computer, a digital broadcast terminal, a tablet device, or a personal digital assistant.

As shown in FIG. 8, the system 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls overall operations of the system 800, such as operations relating to display, a telephone call, data communication, a camera operation, and a recording operation. The processing component 802 may include one or more processors 820 for executing instructions to complete all or a part of steps of the above method. The processors 820 may include CPU, GPU, DSP, or other processors. Further, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store different types of data to support operations of the system 800. Examples of such data include instructions, contact data, phonebook data, messages, pictures, videos, and so on for any application or method that operates on the system 800. The memory 804 may be implemented by any type of volatile or non-volatile storage devices or a combination thereof, and the memory 804 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 806 supplies power for different components of the system 800. The power supply component 806 may include a power supply management system, one or more power supplies, and other components associated with generating, managing, and distributing power for the system 800.

The multimedia component 808 includes a screen providing an output interface between the system 800 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 808 may include a front camera and/or a rear camera. When the system 800 is in an operation mode, such as a shooting mode or a video mode, the front camera and/or the rear camera may receive external multimedia data.

The audio component 810 is configured to output and/or input an audio signal. For example, the audio component 810 includes a microphone (MIC). When the system 800 is in an operating mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting an audio signal.

The I/O interface 812 provides an interface between the processing component 802 and a peripheral interface module. The above peripheral interface module may be a keyboard, a click wheel, a button, or the like. These buttons may include but not limited to, a home button, a volume button, a start button, and a lock button.

The sensor component 814 includes one or more sensors for providing a state assessment in different aspects for the system 800. For example, the sensor component 814 may detect an on/off state of the system 800 and relative locations of components. For example, the components are a display and a keypad of the system 800. The sensor component 814 may also detect a position change of the system 800 or a component of the system 800, presence or absence of a contact of a user on the system 800, an orientation or acceleration/deceleration of the system 800, and a temperature change of system 800. The sensor component 814 may include a proximity sensor configured to detect presence of a nearby object without any physical touch. The sensor component 814 may further include an optical sensor, such as a CMOS or CCD image sensor used in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless communication between the system 800 and other devices. The system 800 may access a wireless network based on a communication standard, such as WiFi, 4G, or a combination thereof. In an example, the communication component 816 receives a broadcast signal or broadcast related information from an external broadcast management system via a broadcast channel. In an example, the communication component 816 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 800 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk etc.

Figure 5:
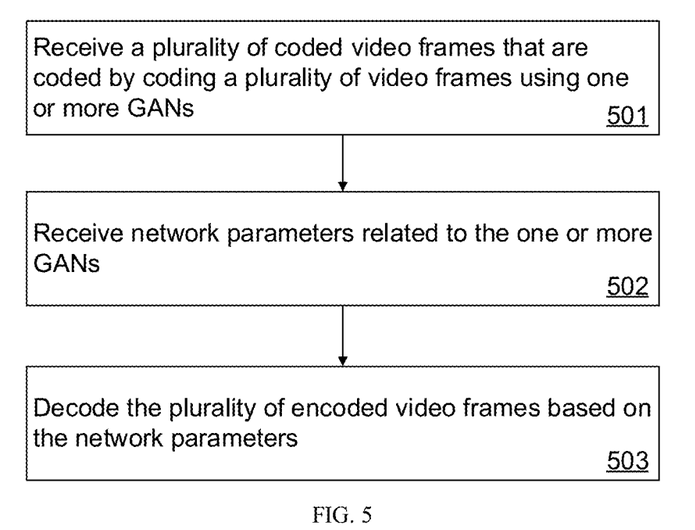
FIG. 5 is a flowchart illustrating a method for video processing in accordance with an example of the present disclosure.

FIG. 5 is a flowchart illustrating a method for video processing in accordance with an example of the present disclosure.

In step 501, a decoding terminal receives a plurality of coded video frames coded using one or more GANs.

In some examples, the one or more GANs respectively implement one or more video coding functions including reference-frame coding, motion-compensated frame prediction, and residue-frame coding, etc.

To implement the reference-frame coding, the GAN is first trained by: inputting raw reference frame to the GAN, feeding the input frame into the encoder network, quantizing the encoded features, concatenating the quantized features with sample noises together into the generator network, then the generator producing the reconstructed reference frame, labeling the reconstructed reference frame as fake and the raw reference frame as real, and feeding the labeled data into the discriminator for training.

After the GAN is trained, inference process is implemented by feeding test frames into the encoder and generator to obtain the reconstructed test frames. The discriminator is not used in the inference process.

In some examples, the one or more GANs include the GAN that includes the residue-frame encoder 101, the generator 103, and/or the discriminator 104 as illustrated in FIG. 1.

In step 502, the decoding terminal receives network parameters that are related to the one or more GANs.

Figure 6:
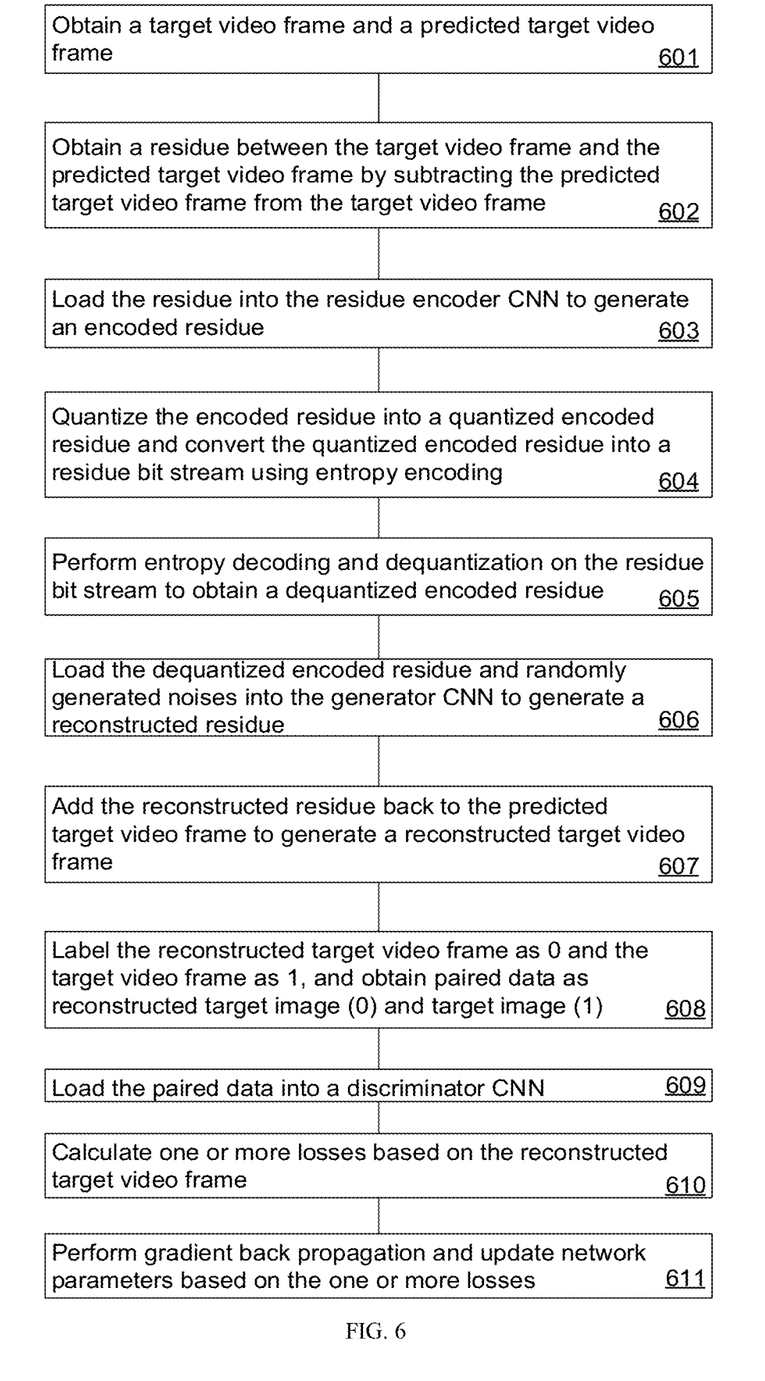
FIG. 6 is a flowchart illustrating a method for training a GAN to implement residue-frame coding in accordance with another example of the present disclosure.

In some examples, the network parameters may be trained by a training process as illustrated in FIG. 6.

In step 503, the decoding terminal decodes the plurality of coded video frames using GANs based on the network parameters.

FIG. 6 is a flowchart illustrating a method for training a GAN to implement residue-frame coding in accordance with another example of the present disclosure.

In step 601, a target video frame and a predicted target video frame are obtained. In some examples, the target video frame may be the target frame $X_t$ and the predicted target video frame may be the motion-compensated prediction $X_t^p$, as shown in FIG. 1.

Figure 7:
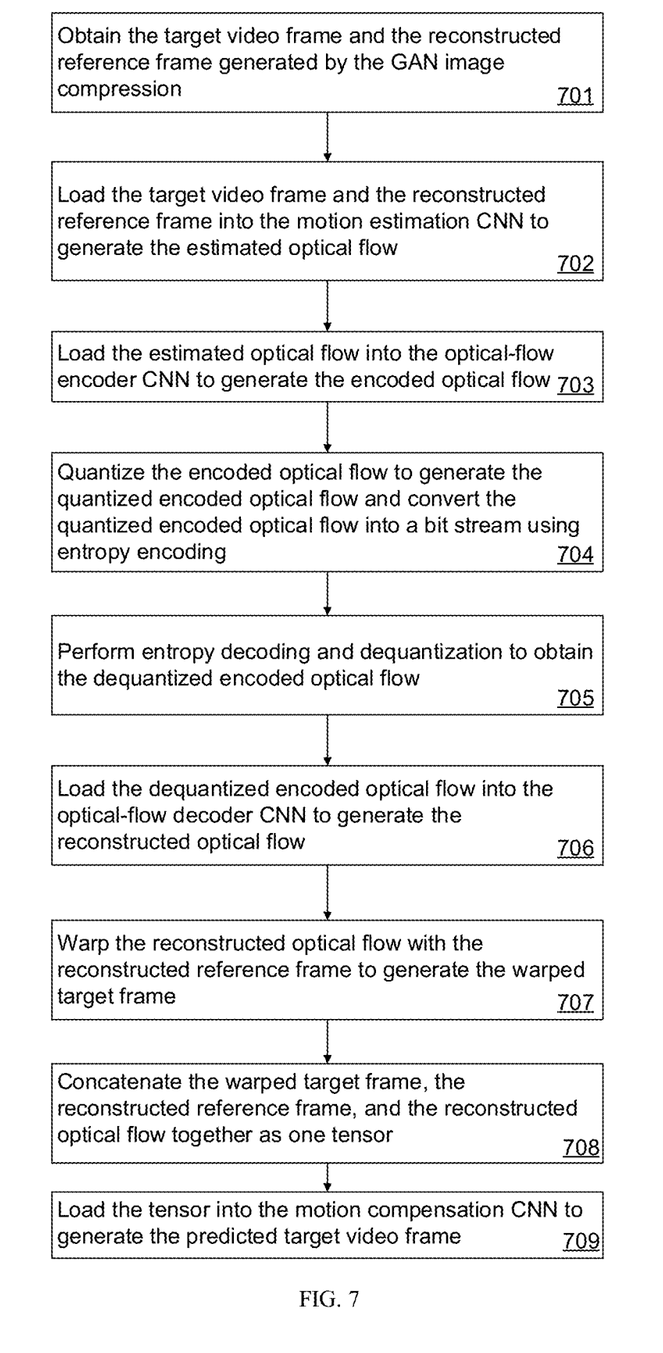
FIG. 7 is a flowchart illustrating a method for motion-compensated prediction in accordance with an example of the present disclosure.

In some examples, the predicted target video frame may be obtained according to a process illustrated in FIG. 7.

In step 602, a residue is obtained between the target video frame and the predicted target video frame by subtracting the predicted target video frame from the target video frame. In some examples, the residue may be the residue frame $X_t^r$ as shown in FIG. 1.

In step 603, the residue is loaded into the residue encoder CNN to generate an encoded residue. In some examples, the residue encoder CNN may be the residue-frame encoder 101 and the encoded residue may be the encoded residue feature $Y_t^r$, as shown in FIG. 1.

In step 604, the encoded residue is quantized into a quantized encoded residue and the quantized encoded residue is converted into a residue bit stream using entropy encoding.

In step 605, entropy decoding and dequantization are performed on the residue bit stream to obtain a dequantized encoded residue.

In some examples, the steps 604 and 605 may be performed by the residue feature compression 102, as shown in FIG. 1.

In step 606, the dequantized encoded residue and randomly generated noises are loaded into the generator CNN to generate a reconstructed residue. In some examples, the generator CNN may be the generator 103 as shown in FIG. 1.

In step 607, the reconstructed residue is added back to the predicted target video frame to generate a reconstructed target video frame. In some examples, the reconstructed residue may be the decoded residue frame $\hat{X}_t^r$, the predicted target video frame may be the prediction $X_t^p$, and the reconstructed target video frame may be the decoded target frame $\hat{X}_t$, as shown in FIG. 1.

In step 608, the reconstructed target video frame is labeled as 0 and the target video frame is labeled as 1, and paired data is obtained as reconstructed target image (0) and target image (1).

In step 609, the paired data is loaded into a discriminator CNN. In some examples, the discriminator CNN may be the discriminator 104 as shown in FIG. 1.

In step 610, one or more losses are calculated based on the reconstructed target video frame.

In step 611, gradient back propagation is performed, and network parameters are updated based on the one or more losses.

In some examples, the network parameters obtained in step 611 may be the network parameters received in the step 502.

In some examples, the one or more losses may include a generator loss, a distortion loss, a feature loss, and a discriminator loss.

In some examples, the generator loss may be obtained based on the reconstructed target video frame.

In some examples, the distortion loss may be obtained based on an MSE between the target video frame and the reconstructed target video frame.

In some examples, the feature loss may be obtained based on an MSE between discriminator features extracted from three scales of the target video frame and the reconstructed target video frame.

In some examples, the discriminator loss may be obtained based on last-layer discriminator features extracted from the target video frame and the reconstructed target video frame.

FIG. 7 is a flowchart illustrating a method for motion-compensated prediction in accordance with an example of the present disclosure.

In step 701, the target video frame and the reconstructed reference frame generated by the GAN image compression are obtained. In some examples, the target video frame may be the target frame $X_t$ as shown in FIGS. 1-2 and the reconstructed reference frame may be the decoded reference frame $\hat{X}_{t-1}$ as shown in FIG. 2.

In step 702, the target video frame and the reconstructed reference frame are loaded into the motion estimation CNN to generate the estimated optical flow. In some examples, the motion estimation CNN may be the motion estimation 201 and the estimated optical flow may be the optical flow $F_{t-1 \to t}$ as shown in FIG. 2.

In step 703, the estimated optical flow is loaded into the optical-flow encoder CNN to generate the encoded optical flow.

In step 704, the encoded optical flow is quantized to generate the quantized encoded optical flow and the quantized encoded optical flow is converted into a bit stream using entropy encoding.

In step 705, entropy decoding and dequantization are performed to obtain the dequantized encoded optical flow.

In step 706, the dequantized encoded optical flow is loaded into the optical-flow decoder CNN to generate the reconstructed optical flow.

In some examples, the reconstructed optical flow may be the decoded optical flow $\hat{F}_{t-1 \to t}$ as shown in FIG. 2.

In some examples, the optical-flow compression 202 may include the optical-flow encoder CNN and the optical-flow decoder CNN, as shown in FIG. 2.

In step 707, the reconstructed optical flow is warped with the reconstructed reference frame to generate the warped target frame. In some examples, the warped target frame may be the warped target frame $X_t^w$.

In step 708, the warped target frame, the reconstructed reference frame, and the reconstructed optical flow are concatenated together as one tensor.

In step 709, the tensor is loaded into the motion compensation CNN to generate the predicted target video frame. In some examples, the motion compensation CNN may be the motion compensation 204, as shown in FIG. 2.

In some examples, there is provided a non-transitory computer readable storage medium, having instructions stored therein. When the instructions are executed by one or more processors 820, the instructions cause the processor to perform methods as illustrated in FIGS. 6-7 and described above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video processing, comprising:
receiving, by a decoding terminal, a plurality of coded video frames coded using one or more generative adversarial networks (GANs);
receiving, by the decoding terminal, network parameters related to the one or more GANs; and
decoding, by the decoding terminal, the plurality of coded video frames using GANs based on the network parameters,
wherein one of the one or more GANs is trained to implement residue-frame coding by:
obtaining a residue between a target video frame and a predicted target video frame;
loading the residue into a residue encoder convolutional neural network (CNN) to generate an encoded residue and obtaining a reconstructed target video frame based on the encoded residue;
calculating one or more losses based on the reconstructed target video frame; and
performing gradient back propagation and updating network parameters related to the GAN based on the one or more losses,
wherein the one or more losses comprise a generator loss, a distortion loss, a feature loss, and a discriminator loss,
wherein the method further comprises:
obtaining the generator loss based on the reconstructed target video frame;
obtaining the distortion loss based on a mean squared error (MSE) between the target video frame and the reconstructed target video frame;
obtaining the feature loss based on an MSE between discriminator features extracted from three scales of the target video frame and the reconstructed target video frame; and
obtaining the discriminator loss based on last-layer discriminator features extracted from the target video frame and the reconstructed target video frame.

2. The method of claim 1, wherein the one or more GANs respectively implement one or more video coding functions comprising reference-frame coding, motion-compensated frame prediction, and residue-frame coding.

3. The method of claim 1, further comprising:
obtaining a dequantized encoded residue based on the encoded residue;
generating a reconstructed residue based on the dequantized encoded residue; and
obtaining the reconstructed target video frame based on the reconstructed residue.

4. The method of claim 3, further comprising:
generating a quantized encoded residue by quantizing the encoded residue;
converting the quantized encoded residue into a residue bit stream using entropy encoding; and
converting the residue bit stream into the dequantized encoded residue by entropy decoding and dequantization.

5. The method of claim 1, further comprising:
obtaining a reconstructed reference frame using a GAN image compression;
loading the target video frame and the reconstructed reference frame into a motion estimation CNN to generate an estimated optical flow;
loading the estimated flow into an optical-flow encoder CNN to generate an encoded optical flow;
obtaining a reconstructed optical flow based on the encoded optical flow;
warping the reconstructed optical flow and the reconstructed reference frame to generate a warped target frame;
concatenating the warped target frame, the reconstructed reference frame, and the reconstructed optical flow as a tensor; and
loading the tensor to a motion compensation CNN to generate the predicted target video frame.

6. The method of claim 1, further comprising:
updating the network parameters based on the generator loss, the distortion loss, the feature loss, and the discriminator loss.

7. An apparatus for video processing, comprising:
one or more processors; and
a memory configured to store instructions executable by the one or more processors,
wherein the one or more processors, upon execution of the instructions, are configured to:
receive a plurality of coded video frames coded using one or more generative adversarial networks (GANs);

receive network parameters related to the one or more GANs; and decode the plurality of coded video frames using GANs based on the network parameters, wherein one of the one or more GANs is trained to implement residue-frame coding by:

obtaining a residue between a target video frame and a predicted target video frame;

loading the residue into a residue encoder convolutional neural network (CNN) to generate an encoded residue and obtaining a reconstructed target video frame based on the encoded residue;

calculating one or more losses based on the reconstructed target video frame; and performing gradient back propagation and updating network parameters related to the GAN based on the one or more losses, wherein the one or more losses comprise a generator loss, a distortion loss, a feature loss, and a discriminator loss, wherein the GAN is trained to implement the residue-frame coding further by:

obtaining the generator loss based on the reconstructed target video frame;

obtaining the distortion loss based on a mean squared error (MSE) between the target video frame and the reconstructed target video frame;

obtaining the feature loss based on an MSE between discriminator features extracted from three scales of the target video frame and the reconstructed target video frame; and obtaining the discriminator loss based on last-layer discriminator features extracted from the target video frame and the reconstructed target video frame.

8. The apparatus of claim 7, wherein the one or more GANs respectively implement one or more video coding functions comprising reference-frame coding, motion-compensated frame prediction, and residue-frame coding.

9. The apparatus of claim 7, wherein the GAN is trained to implement the residue-frame coding further by:

obtaining a dequantized encoded residue based on the encoded residue;

generating a reconstructed residue based on the dequantized encoded residue; and obtaining the reconstructed target video frame based on the reconstructed residue.

10. The apparatus of claim 9, wherein the GAN is trained to implement the residue-frame coding further by:

generating a quantized encoded residue by quantizing the encoded residue;

converting the quantized encoded residue into a residue bit stream using entropy encoding; and converting the residue bit stream into the dequantized encoded residue by entropy decoding and dequantization.

11. The apparatus of claim 7, wherein the GAN is trained to implement the residue-frame coding further by:

obtaining a reconstructed reference frame using a GAN image compression;

loading the target video frame and the reconstructed reference frame into a motion estimation CNN to generate an estimated optical flow;

loading the estimated flow into an optical-flow encoder CNN to generate an encoded optical flow;

obtaining a reconstructed optical flow based on the encoded optical flow;

warping the reconstructed optical flow and the reconstructed reference frame to generate a warped target frame;

concatenating the warped target frame, the reconstructed reference frame, and the reconstructed optical flow as a tensor; and loading the tensor to a motion compensation CNN to generate the predicted target video frame.

12. The apparatus of claim 7, wherein the GAN is trained to implement the residue-frame coding further by:

updating the network parameters based on the generator loss, the distortion loss, the feature loss, and the discriminator loss.

13. A non-transitory computer readable storage medium, comprising instructions stored therein, wherein, upon execution of the instructions by one or more processors, the instructions cause the one or more processors to perform acts comprising:

receiving a plurality of coded video frames coded using one or more generative adversarial networks (GANs);

receiving, by the decoding terminal, network parameters related to the one or more GANs; and decoding the plurality of coded video frames using GANs based on the network parameters, wherein one of the one or more GANs is trained to implement residue-frame coding by:

obtaining a residue between a target video frame and a predicted target video frame;

loading the residue into a residue encoder convolutional neural network (CNN) to generate an encoded residue and obtaining a reconstructed target video frame based on the encoded residue;

calculating one or more losses based on the reconstructed target video frame; and performing gradient back propagation and updating network parameters related to the GAN based on the one or more losses, wherein the one or more losses comprise a generator loss, a distortion loss, a feature loss, and a discriminator loss, wherein the method further comprises:

obtaining the generator loss based on the reconstructed target video frame;

obtaining the distortion loss based on a mean squared error (MSE) between the target video frame and the reconstructed target video frame;

obtaining the feature loss based on an MSE between discriminator features extracted from three scales of the target video frame and the reconstructed target video frame; and obtaining the discriminator loss based on last-layer discriminator features extracted from the target video frame and the reconstructed target video frame.

14. The non-transitory computer readable storage medium of claim 13, wherein the one or more GANs respectively implement one or more video coding functions comprising reference-frame coding, motion-compensated frame prediction, and residue-frame coding.

15. The non-transitory computer readable storage medium of claim 13, wherein the instructions cause the one or more processors to perform acts further comprising:

obtaining a dequantized encoded residue based on the encoded residue;

generating a reconstructed residue based on the dequantized encoded residue; and obtaining the reconstructed target video frame based on the reconstructed residue.

16. The non-transitory computer readable storage medium of claim 15, wherein the GAN is trained to implement the residue-frame coding further by:

generating a quantized encoded residue by quantizing the encoded residue;

converting the quantized encoded residue into a residue bit stream using entropy encoding; and converting the residue bit stream into the dequantized encoded residue by entropy decoding and dequantization.

17. The non-transitory computer readable storage medium of claim 13, wherein the GAN is trained to implement the residue-frame coding further by:

obtaining a reconstructed reference frame using a GAN image compression;

loading the target video frame and the reconstructed reference frame into a motion estimation CNN to generate an estimated optical flow;

loading the estimated flow into an optical-flow encoder CNN to generate an encoded optical flow;

obtaining a reconstructed optical flow based on the encoded optical flow;

warping the reconstructed optical flow and the reconstructed reference frame to generate a warped target frame;

concatenating the warped target frame, the reconstructed reference frame, and the reconstructed optical flow as a tensor; and loading the tensor to a motion compensation CNN to generate the predicted target video frame.

18. The non-transitory computer readable storage medium of claim 13, wherein the GAN is trained to implement the residue-frame coding further by:

updating the network parameters based on the generator loss, the distortion loss, the feature loss, and the discriminator loss.

* * * * *